(12) United States Patent
Rangaraj et al.

(10) Patent No.: US 10,074,089 B1
(45) Date of Patent: Sep. 11, 2018

(54) SMART AUTHENTICATION AND IDENTIFICATION VIA VOICEPRINTS

(75) Inventors: Mavanur Narakesari Rangaraj, The Gardens at Bishan (SG); Xerxes Navzar Dotivala, Costa Rhu (SG); Sopnendu Mohanty, Pebble Bay (SG); Sam Chang Chia Shian, Singapore (SG); Kaustab Roy, Singapore (SG); Pedro Manuel Vicente, Gallop Gables (SG)

(73) Assignee: Citigroup Technology, Inc., Weehawken, NJ (US)

( * ) Notice: Subject to any disclaimer, the term of this patent is extended or adjusted under 35 U.S.C. 154(b) by 682 days.

(21) Appl. No.: 13/409,710

(22) Filed: Mar. 1, 2012

(51) Int. Cl.
*G06Q 20/40* (2012.01)
*G10L 17/00* (2013.01)

(52) U.S. Cl.
CPC ...... *G06Q 20/40145* (2013.01); *G10L 17/005* (2013.01)

(58) Field of Classification Search
USPC ........................................ 704/246; 705/64
See application file for complete search history.

(56) References Cited

U.S. PATENT DOCUMENTS

| | | | | |
|---|---|---|---|---|
| 7,360,694 B2 * | 4/2008 | Wankmueller | ......... | G06Q 20/04 235/379 |
| 7,430,287 B2 * | 9/2008 | Daugherty | ............. | G06F 21/32 379/114.14 |
| 7,865,401 B2 * | 1/2011 | Nakajima | ............. | G06Q 20/02 705/26.1 |
| 2002/0087463 A1 * | 7/2002 | Fitzgerald | ............. | G06Q 20/04 705/39 |
| 2006/0026097 A1 * | 2/2006 | Nethery, III | ......... | G06Q 20/102 705/40 |
| 2008/0312924 A1 * | 12/2008 | De Los Reyes | ...... | G10L 17/005 704/246 |
| 2010/0328035 A1 * | 12/2010 | Hanley | ............. | G07C 9/00158 340/5.84 |
| 2011/0213615 A1 * | 9/2011 | Summerfield | .......... | G06F 21/32 704/246 |

FOREIGN PATENT DOCUMENTS

EP            1424844 A1 *   6/2004   ............. G10L 15/19

\* cited by examiner

*Primary Examiner* — Tsan-Yu J Huang
(74) *Attorney, Agent, or Firm* — Eric L. Sophir; Dentons US LLP

(57) ABSTRACT

The systems and methods described herein allow an electronic transaction to be performed upon determining, via biometric data, that an authorized individual is conducting the transaction. This may involve receiving, by a computer system, a request to authorize an electronic transaction for an account. The computer system is configured to access a phone number, which is stored in computer memory and associated with the enrolled user of the account. An automated and outward call to the phone number is performed by the computer system. The computer system is configured to capture a voiceprint in association with voice data received from the automated call. The captured voiceprint is compared to a registered voiceprint, which is stored in the computer memory in association with the enrolled user. The computer system responds to the request to authorize the secure electronic transaction based on said comparison.

18 Claims, 5 Drawing Sheets

SMART AUTHENTICATION AND IDENTIFICATION VIA VOICEPRINTS

FIELD OF THE INVENTION

The present invention relates generally to conducting secure transactions with systems and methods that are configured to authenticate authorized users via biometric data, which may be obtained in relation to these transactions. The systems and methods are also configured to provide pertinent information relating to biometric data that has been gathered, for example, in association with these transactions.

BACKGROUND

In order to ensure a secure transaction, a conventional system may request a user to input the user's account information together with a password, such as a personal identification number (PIN). A PIN is typically a four to eight digit number, which can be used to authenticate the transaction. A conventional system of this type allows the requested transaction to occur when there is a match between the entered PIN number that is input into the system at the time of the request and the PIN number that is stored in the system in association with the user's account information.

There are some drawbacks, however, to the conventional system. One drawback is that a PIN serves as a numeric password for the user to gain access to system, but the PIN itself does not uniquely identify a user. Therefore, the conventional system is configured to authorize a transaction for an unauthorized user when provided with the correct information, including the PIN. So the conventional system is not configured to discriminate between an authorized user and other individuals who are not authorized to access the account.

Furthermore, with increases in electronic and remote transactions, as well as data theft, these conventional systems, which rely primarily on entering the correct PIN, are unable to ensure that the individual accessing the account is an authorized user or an unauthorized user. In the event of fraudulent activity, the failure of the conventional system to make this distinction may result in unnecessary losses to at least the account holders and the organizations that employ these conventional systems.

SUMMARY

The systems and methods described herein attempt to cure the deficiencies of the conventional systems by providing secure electronic transactions via a system that performs a seamless and dynamic authorization process involving biometric data. While conventional systems may use a password, such as a PIN, to authorize a transaction, the embodiments described herein provide a system that is configured to enable authorized users to conduct a secure transaction based upon an authentication process involving their own biometric data, such as voiceprints, which serve as unique and unobtrusive identifiers. In addition, the embodiments described herein provide a system that is configured to retrieve and provide information concerning individuals that are able to be identified by the biometric data that is stored in the system.

In one embodiment, a computer-implemented method for conducting a secure transaction comprises receiving, by a computer, a request to authorize the secure electronic transaction for an enrolled user; accessing, by a computer, a phone number that is stored in a non-transitory computer readable media and associated with the enrolled user; performing, by a computer, an automated call to the phone number; capturing, by a computer, a voiceprint in association with voice data received from the automated call; comparing, by a computer, the captured voiceprint with a registered voiceprint that is stored in the computer readable media in association with the enrolled user; and responding, by a computer, to the request to authorize the secure electronic transaction based on said comparison.

In another embodiment, a computer-implemented method for conducting a secure transaction comprises providing, to a computer, a request to authorize the secure electronic transaction for an account; receiving, by a computer, an automated call at a phone number that is stored in non-transitory computer readable media associated with the computer system; receiving, by a computer, a transmission from a communication device having voice data received from the automated call; and receiving, from the computer system, a response to the request for authorization based on a comparison of a voiceprint that is captured from the voice data of the automated call and a registered voiceprint that is stored in the computer readable media in association with an authorized user of the account.

In yet another embodiment, a non-transitory computer readable medium having computer readable program code therein, the computer readable program code being executable by a processor to implement a method for conducting a transaction, the method comprises receiving a request to authorize the secure electronic transaction for an enrolled user; accessing a phone number that is stored in computer memory and associated with the enrolled user; performing an automated call to the phone number; capturing a voiceprint in association with voice data received from the automated call; comparing the captured voiceprint with a registered voiceprint that is stored in the computer memory in association with the enrolled user; and responding to the request to authorize the secure electronic transaction based on said comparison.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

The systems and methods described herein allow a user or customer to have his/her identity verified and/or confirmed through an authentication process involving biometric data, such as voiceprints. More specifically, the systems and methods described herein are able to continuously and seamlessly fine tune or temper the voiceprint data in each instance that an utterance and/or voice-out is successfully captured. In other words, the quality of the service provided by the systems and methods can be improved with increased use. As described below, the systems and methods provide secure transactions by ensuring that only authorized users are enabled to perform certain actions in accordance with the privileges that have been granted to them.

Figure 1:
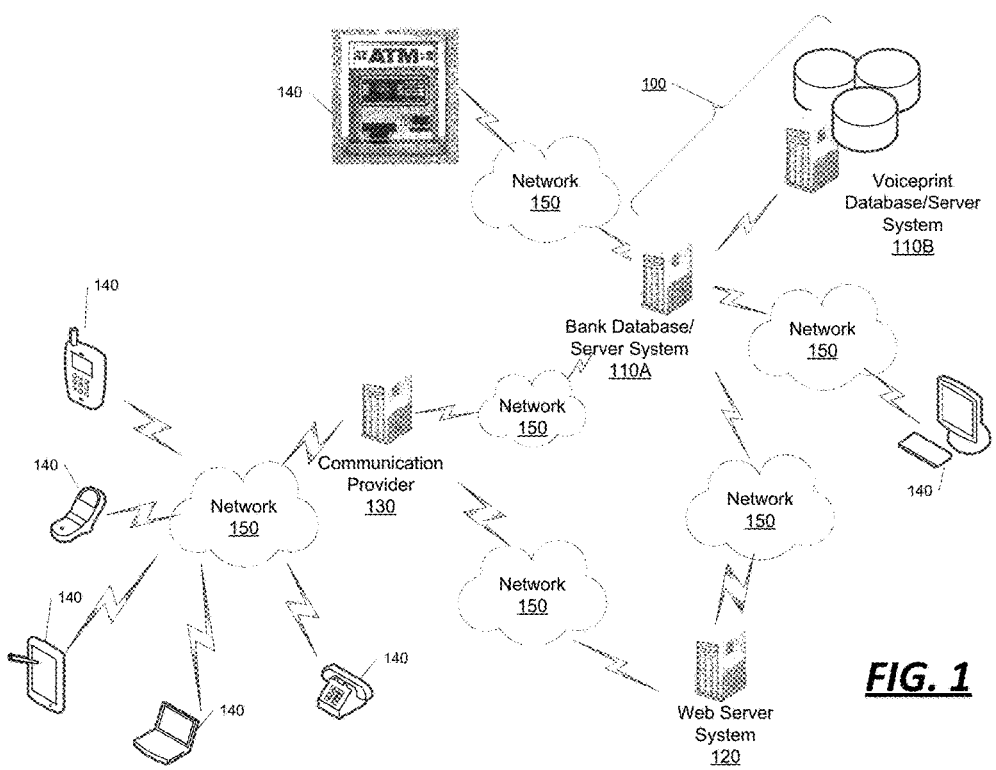
FIG. 1 shows a system architecture according to an exemplary embodiment.

Referring to FIG. 1, a system overview is shown according to an exemplary embodiment. In this exemplary embodiment, the system relates to providing secure financial transactions by implementing an authorization process based on voiceprints and/or spectrographic data. This system is therefore able to able to capture voiceprints from voice-outs from any language (e.g., English, German, Chinese). Financial transactions include, but are not limited to, deposits, withdrawals, account transfers, stock transactions, loan applications, credit card or debit card or check card issuance or replacement, certified or bank check printing, account balance, account openings and closings, credit card cash advances, purchase prepaid mobile phone credits, exchange currency, and payments.

System 100 may include at least one of an organization's database/server system 110A and a voiceprint database/server system 110B. Bank database/server system 110A may include information relating to banking operations, customer profiles, account information, and other information that may be pertinent to the bank. Voiceprint database/server system 110B may include at least a database section of authorized voiceprints and records stored in a database of imposter voiceprints. Voiceprint database/server system 110B may also include any relevant data pertaining to the voiceprints. Relevant data may include, for example, voiceprint timestamp data, voiceprint identifiers, and voiceprint classification data. The database of authorized voiceprints may include records of voiceprints that have been registered with the system and voiceprints that have been authenticated by the system. The database of imposter voiceprints may include records of voiceprints that are fraudulent or voiceprints that are believed to be associated with fraudulent attempts. For example, voiceprints that do not have a relatively high correlation value with respect to the corresponding voiceprint that is stored in system 100, as determined by a threshold value, may be stored in the database of imposter voiceprints.

Voiceprint database/server system 110B may also be configured to include a database that includes other voice data, such as voice data that is able to be captured and/or recorded by system 100. In one example, system 100 may be configured to capture and record this other voice data in each or substantially each instance in which a communication device 140 is involved in a communication associated with the financial institution. To illustrate, this other voice data may relate to communications between an individual and a customer service representative of the bank. These communications may be stored in system 100 and associated with any information that is received during these communications. As examples, the received information may include at least one of account information, data from an individual's profile, an identifier of a communication device, and a telephone number. The data of these communications may be used to further enhance and improve the voiceprints and/or related data within the database section of authorized voiceprints and the database section of imposter voiceprints.

System 100 is configured to request and receive biometric data, such as spectrographic data of voiceprints. System 100 may perform a process to authenticate and/or identify an individual based on the biometric data. System 100 is also configured to enable an authenticated user to conduct a transaction via a communication device 140 based on a result of the authentication process.

System 100 is also configured to respond to requests for biometric data, such as voice data, voiceprints, and other related data. In this regard, because system 100 saves voiceprints and other related data in association with transactions, system 100 is also enabled to provide this information when requested. As one example, system 100 may receive a request for information pertaining to at least one transaction of a particular account. Upon receiving the request, system 100 may then search for this information, generate a report based on this information, if available, and provide this information to the requestee or a designated entity. The availability of such information may be used to effectively settle a dispute, such as a claim that an individual's card and PIN were lost/stolen and inappropriately used by someone else.

System 100 may include a platform that is enabled to continuously update, add, or amend the information of the database section of authorized voiceprints and the database section of imposter voiceprints. In this regard, the continuous tempering of the database section of authorized voiceprints associated with authorized users improves the quality of the voiceprints, which are relied upon by system 100. Also, the continuous updating of the database section of imposter voiceprints will increase the chances that a fraudulent attempt or repeated fraudulent attempts will be identified by system 100 and addressed by the appropriate entity. Additionally, the system's platform may feed the database section that includes other voice data to a module that is configured to enhance the database section of authorized voiceprints and the database section of imposter voiceprints. System 110 may be connected to communication device 140 via at least one of a web server system 120 and a communication provider 130.

Communication device 140 may be any unit that is configured to transmit, receive, and process voice data and/or sounds as input/output. For example, communication terminal 140 may be a telephone, a cellular or mobile phone, a tablet with a communication device, a personal data assistant (PDA) with a communication device, a laptop computer with a communication device, a personal computer with a communication device, an automated teller machine (ATM) with a communication device, or any communication apparatus and/or communication device. Communication device 140 can be located in a variety of locations. Communication device 140 may be a stand-alone unit or a part of a communication apparatus or computing apparatus.

Network 150 may be any suitable network for enabling communication between the system 100 and communication terminal 140. Network 150 may include the appropriate networking devices for enabling such communication. With network 150, system 100 is configured to implement a seamless and secure method of authenticating and/or identifying an authorized user in association with financial transactions. In order to authenticate and/or identify a user, system 100 requires a user to register his/her voiceprint with the system.

Figure 2:
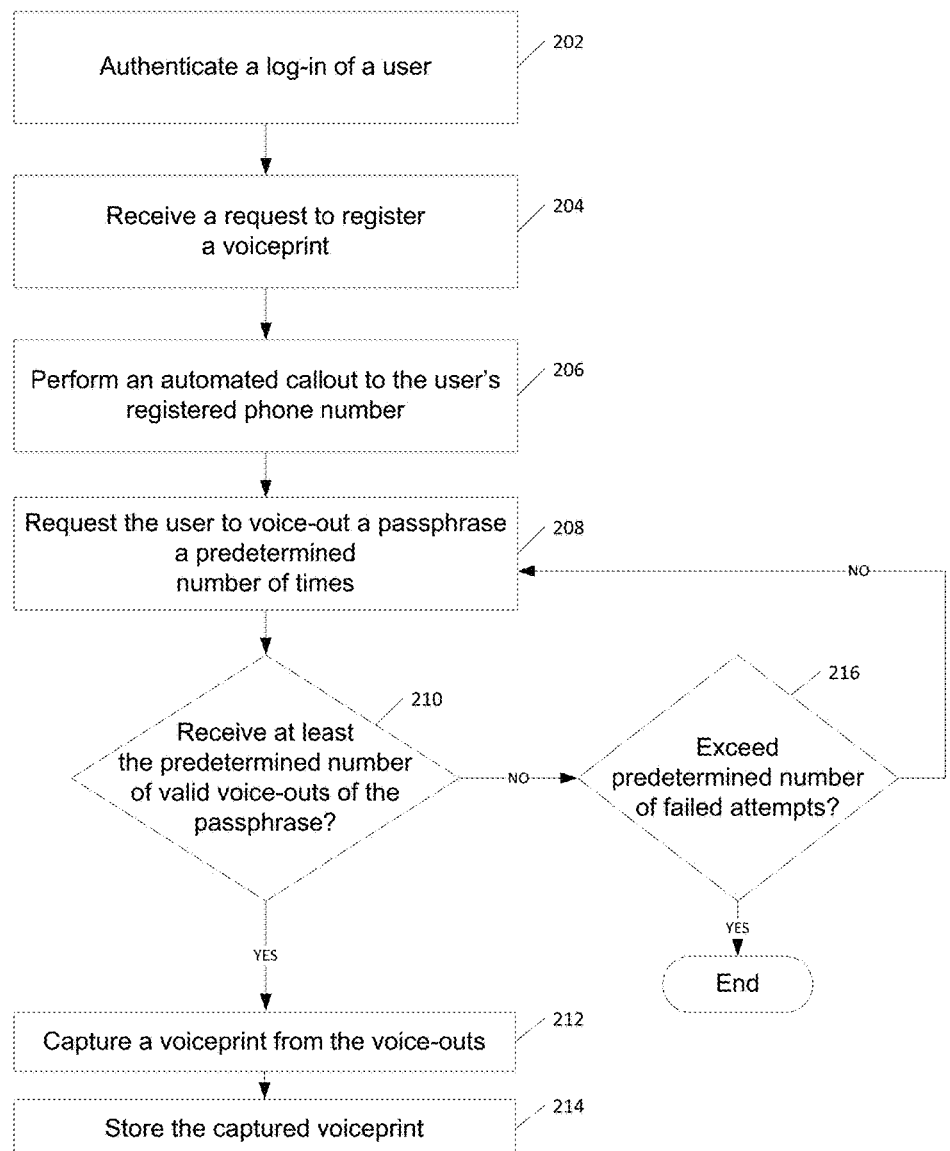
FIG. 2 shows a process of registering a voiceprint with the system according to an exemplary embodiment.

Referring to FIG. 2, a method of registering a voiceprint with the system is shown in accordance with one exemplary embodiment. In this embodiment, in order to register a voiceprint, system 100 may require a user to log into the user's online account with the bank, which provides a secure online banking channel. Such a login process may require the user to provide, for example, an account number and PIN that matches the same information that is stored in the bank's database/server system 110A. For example, the account number may refer to a checking, savings, investment, debit, credit, or any other financial account that is associated with the user. The PIN number, which is requested in the login process, is the code that is associated with the account number that is being entered. Once this information is successfully provided, system 100 advances to 202.

At 202, system 100 is configured to authenticate a login of a user when the requested information, which has been input into the system, matches the registered information, which is stored in the system. When such a match occurs, the user is logged into his/her online account. Once logged-in, the user is able to access a number of user interfaces and/or menu options that are associated user's online account and privileges.

In this example, the user may be a customer, an operator, a staff member of the organization (e.g., banking institution), a member of a designated call center, or any individual related to the organization that can contribute voice data to system 100. In addition, system 100 may allow a user that is logged into the system to register voice data of other appointed individuals, such as another individual that has been granted a Power of Attorney, an authorized signer of a company account, or a joint account holder, provided that system 100 has user profile information for that appointed individual.

In one embodiment, system 100 may be configured to provide an auto-prompt to register a voiceprint in association with a user interface. The auto-prompt may include a link, which, upon activation, is configured to cause system 100 to initiate the voiceprint registration process. Alternatively, the link may also be presented on a user interface for a banking transaction, such as online banking or an automated teller machine interface. The link may be present in a list of options, a banner, or other selectable feature. In this alternative, the user can select the link at any time to register voice data.

At 204, when the link is activated, system 100 receives a request to register a voiceprint and initiates the voiceprint registration process. The selection of the link can cause a transmission to be sent to a web server of the system that instructs another server to start the voice registration process.

At 206, upon receiving a request to register a voiceprint, system 100 initiates a process to perform an automated callout to the user's registered phone number. To perform the automated callout, system 100 accesses the user's information from system 100 and retrieves the user's pre-registered phone number. A computing system associated with system 100 is configured to dial the user's pre-registered phone number to perform the automated callout. The pre-registered telephone number may be obtained by accessing a highly controlled and governed user profile system that is stored within system 100. Upon successfully receiving an answer at the pre-registered phone number, system 100 proceeds to 208.

At 208, in one embodiment, system 100 may be automated to request the user to voice-out a passphrase a predetermined number of times. The passphrase serves as a means by which system 100 may protect against pre-recorded voice data. The passphrase may be any statement or response to any type of data. As one example, system 100 may require the user to voice-out or repeat a randomly selected statement from a number of statements, which have been prepared by the bank and given to the user at the time of requesting the passphrase. As other non-limiting examples, the passphrase may be a response to a request for personal information regarding the user, such as the user's date of birth, the user's mother's maiden name, the user's account number, or any other information of this type. Passphrases, which require a correct answer/response, provide an additional level of security as compared to passphrases, which require a voice-out of a randomly selected statement. Once this request has been made, system 100 proceeds to 210.

To illustrate, system 100 may request a user to voice-out a user's date of birth at least three times. In this case, system 100 requests a user to voice-out each digit of the month, the date, and the year in the following numeric format: mm/dd/yyyy. According to this example, system 100 would receive eight words (i.e., one voice-out for each number) for this passphrase. So, for a date of birth of Jul. 7, 1970, a user would voice-out zero, seven, zero, seven, one, nine, seven, and zero. When this passphrase is repeated three times, system 100 receives a total of 24 words that could be used to create a voiceprint.

At 210, system 100 determines whether or not valid voice-outs of the predetermined number have been received. A voice-out is considered valid if the voice-out is able to be successfully used in creating a voiceprint. As an example, system 100 may consider a voice-out that contains a significant amount of background noise to be invalid. Additionally or alternatively, the validity of the voice-out may be determined based on whether or not the correct information was provided for the passphrase. In such a case, for example, when system 100 receives a voice-out of Jul. 8, 1970 for the date of birth instead of the expected answer of Jul. 7, 1970, as registered, then system 100 may determine that the voice-out is invalid.

If system 100 has received valid voice-outs of the amount requested, then system 100 proceeds to 212. In the alternative, if system 100 does not receive a predetermined number of valid-voice outs, system 100 proceeds to 216.

At 212, upon receiving valid voice-outs of the predetermined number, system 100 captures a voiceprint from data of the captured voice-outs. Capturing a voiceprint may involve mathematical modeling, matrices, templates, Markov models, vector quantization, decision trees, frequency modeling, frequency estimations, mathematical algorithms, and/or other mathematical techniques. As one example, the voiceprint may take the form of a spectrogram or spectrographic data. Such data may include a representation of a sound's frequency with respect to time. The spectrogram may also represent the acoustical qualities of the sound. When a valid voiceprint has been captured, system 100 proceeds to 214.

At 214, system 100 is configured to store the captured voiceprint. The captured voiceprint may be associated with the user's information along with any related data. As an example, related data may include data from the user's profile, voiceprint timestamps, and account information.

Once the voiceprint is stored in system 100, the quality of the voiceprint may be improved and/or enhanced by tempering the initial registered voiceprint with additional voiceprints and/or voice data, which are associated with the same user and determined to be valid by the system 100. The tempering of the voiceprints provides system 100 with the advantage of being able to adapt at a suitable rate to changes that may occur with respect to an individual's voice over time.

At this point, system 100 may notify the user that the user's voiceprint was successfully captured and registered. In one example, system 100 may provide a status update on a user interface of the user's online account to indicate successful capture of the user's voiceprint. As other examples, system 100 may perform an automated call to the registered phone number of the account to convey this information, send a text message to the registered phone number of the account to provide this information, and/or send an e-mail notification to the registered e-mail address to notify the authorized user of this status update.

At 216, system 100 determines whether to continue to 208 or to terminate the instant process. This decision may be based on whether a predetermined number of failed attempts have been exceeded. In another example, this decision may be based on whether or not a predetermined time limit to capture this information has been exceeded.

Once a voiceprint is successfully registered and the process completed, system 100 is configured to utilize the registered voiceprint as a means to authenticate an individual or identify an individual. As previously mentioned, system 100 enables a number of different types of users (e.g., customer, bank employee, individual granted POA, a signing authority of a company) to register a voiceprint. This feature is able to prevent unauthorized attempts and/or fraud in a number of different scenarios.

As an example, system 100 may include voiceprint registrations of each bank employee. System 100 may employ a security matrix to control staff enrollment. In one embodiment, in each instance that the bank employee needs to conduct a transaction or perform an operation, system 100 may require a voiceprint to verify the identity of the bank employee and ensure that the bank employee has the authorization to perform the current task. In addition, to provide varying levels of security, system 100 may require a voiceprint of the bank employee, as well as other data that enables the identity of the bank employee to be verified. By providing such features, system 100 prevents unauthorized use of employee accounts and privileges because employees cannot share, lose, or otherwise compromise their voice data with other individuals in the same fashion as, for example, IDs and passwords. Further, these features may also prevent unnecessary and costly resetting of accounts and passwords which may occur when IDs and passwords are compromised.

As another example, system 100 may enable a number of authorized users of the account to register their voiceprints, as discussed. In this regard, the account may be a joint account and may thus require joint authorization. The account may be one in which an authorized user may allow another individual to conduct certain transactions with respect to the account. This scenario may include an account holder bestowing certain privileges of the account or a sub-account to at least one other individual. As non-limiting examples, the individual may be a relative, an individual granted a power of attorney or other authorization, or an individual of the account holder's choosing. By registering voiceprints of each authorized user and/or each appointed individual with certain privileges to the account, the organization employing system 100 is able to ensure that the authorized user's authentication information is not compromised or shared with these other individuals. Via voiceprints, system 100 is configured provide a record of the identity of the actual authorized user that performed each action so that each authorized user is aware of each others' actions.

To illustrate, a father may allow his son to withdraw a certain amount of money from the father's debit account via an ATM machine. With the voiceprint registration process of FIG. 2, the father does not have to share his PIN with his son. Instead, the father can register his son's voiceprint with system 100, and enable the specified amount to be withdrawn from the ATM when the son's voice data is valid and recognized by system 100. This process may require the father to register his son's phone number into system so that system 100 may perform the automated callout to the son's communication device 140. System 100 may also update an account's transaction history to indicate together with a timestamp and location indicator that the son had made the withdrawal of the specified amount so that there no confusion as to whether the father or the son conducted that transaction.

In yet another example, a chief executive officer (CEO) or a chief financial officer (CFO) may delegate some staff members with certain privileges to a number of corporate accounts. The logistics of this task in a conventional system could be burdensome. With the voiceprint registration system of FIG. 2, each of the staff members may be added to the corporate accounts with certain privileges with ease. Also, by recording each of these transactions together with voice data, system 100 is also configured to track and/or monitor each of the transactions in association with each staff member that conducted the respective transaction.

Also, with registered voiceprints, system 100 may provide a number of secure, financial transactions through its voice recognition functionality and its voice identification functionality. In general, the voice recognition functionality, when implemented by system 100, determines via a voiceprint authentication process if the voice data being received translates into a voiceprint that is recognizable as the registered voiceprint (or a tempered version of the registered voiceprint). Typically, the voice recognition functionality involves a one-to-one comparison of the captured voiceprint with the registered voiceprint, and thus, typically, requires information of the type that will provide the registered voiceprint as a basis of comparison for the captured voiceprint.

Although FIG. 2 discusses one example in which the system is enabled to register a user when he/she logs into his/her online account, it is further recognized that a voiceprint may also be registered by other procedures that perform the same objective. In this regard, a voiceprint may be registered via a communication device 140 that is associated with the bank. Such a procedure may be particularly beneficial in cases in which a customer would like to open a new bank account, remotely. In addition to capturing the user's voiceprint, the bank may also perform any additional verification procedures (e.g., ID check) so that the user may perform a remote transaction (e.g., opening an account) at his/her discretion. Within a predetermined timeframe, system 100 may then perform an automated callout to the customer to perform voiceprint authentication. System 100 may also be configured to perform a verification process based on information, which was registered with the bank. Such procedures may ensure that the individual that registered the voiceprint is the same as the individual that is performing subsequent actions (e.g., opening an account) in this individual's name. By such a configuration, system 100 may prevent account takeovers and other fraudulent activity.

As described, by performing voice recognition functionalities, system 100 is determining whether the newly received voiceprint has a great likelihood of being from the same individual as the registered voiceprint. System 100 is configured to perform this procedure with respect to any language (e.g., French, Korean, Spanish). In one example, system 100 may request the user to indicate in some manner (e.g., keypad entry) the requested communication language in order to better service the client. This feature may be beneficial in a number of circumstances.

As one example, this procedure may beneficial in overcoming language barriers that may occur in communications with the banks or during transactions. By using voice recognition alone, as provided by system 100, an organization with a call center may be relieved of having to validate a number of callers that may or may not be fluent in the same language as members of the call center. So, for example, the voice recognition process of system 100 can validate an identity of a caller from India with relative ease and speed as compared to having to rely on a call center member from China validating the caller's answers.

The voiceprint identification functionality, on the other hand, when implemented by system 100, determines whether the voice data being received translates into a voiceprint that matches any of the previously stored voiceprints. The voiceprint identification functionality may compare the captured voiceprint to a number of different voiceprints that are available in system 100. The voiceprint identification functionality may implement a search algorithm to achieve this objective. The voice recognition functionality and the voice identification functionality are described below.

Figure 3:
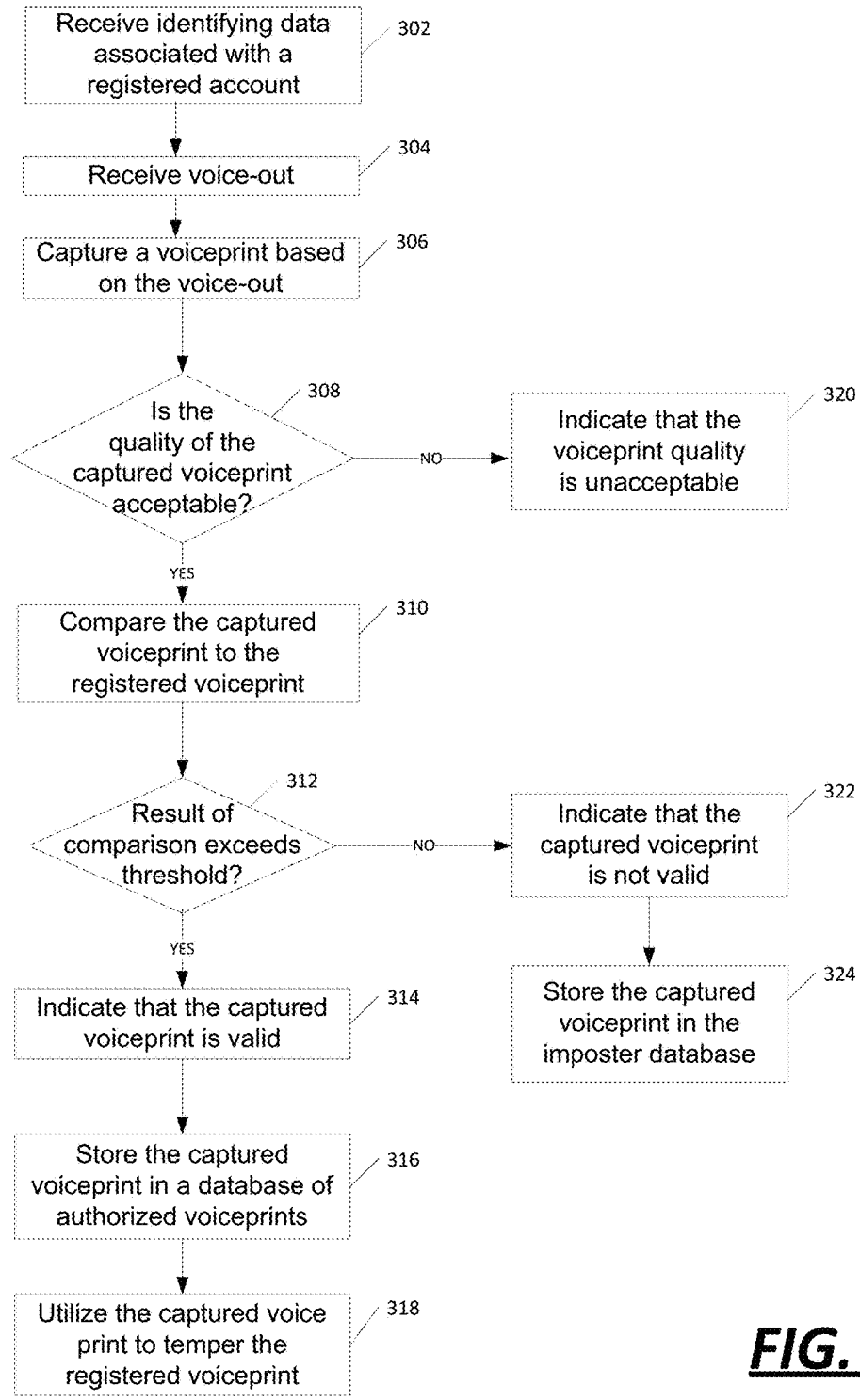
FIG. 3 shows a method of authenticating a voice-out based on the registered voiceprint according to an exemplary embodiment.

Referring to FIG. 3, a method of performing a voice recognition process to authenticate a newly received voiceprint is shown. At 302, system 100 is configured to receive identifying data associated with the registered account. The identifying data refers to data that system 100 may utilize to access the user's registered voiceprint. This data may include data from the user's profile and/or account information.

At 304, system 100 is configured to receive a voice-out transmitted from a communication device 140. As discussed above, communication device 140 may be located anywhere, as long as the communication device 140 is connected to voiceprint database/server system 110B, preferably in a secure and reliable fashion.

At 306, system 100 is configured to process the voice-out and capture a voiceprint based on the at least one voice-out. The method of capturing a voiceprint is similar to that as discussed with respect to 212 of FIG. 2. In addition, in one embodiment, to enhance the clarity of the captured voiceprint, system 100 may perform a noise-reduction process to improve the quality of the voiceprint to the extent possible.

At 308, system 100 is configured to determine if the quality of the captured voiceprint is acceptable. The quality of the voiceprint refers to the purity of the voiceprint. In this regard, for example, system 100 may determine that a voiceprint, taken from voice data that is sharp and has very little disturbance, is deemed acceptable, whereas system 100 may determine that a voiceprint, taken from voice data ridden with noise, is deemed unacceptable.

If the quality of the voiceprint is deemed to be acceptable in accordance with predetermined standards, then the process proceeds to 310. If the quality of the voiceprint is not acceptable, then the process proceeds to 320. In an alternative embodiment, system 100 may perform step 308 after performing step 312.

At 310, system 100 is configured to compare the captured voiceprint to the registered voiceprint. System 100 may implement mathematical algorithms and/or techniques to determine if the captured voiceprint and the registered voiceprint have a great likelihood of being from the same individual. In one embodiment, the mathematical algorithm may be a pattern matching algorithm. As one example, when performing the comparison, system 100 may implement a mathematical algorithm to generate a correlation value within a predetermined range to indicate a level of correlation between the captured voiceprint and the registered voiceprint. In one example, the predetermined range may be between zero and one hundred. The predetermined range may be set so that a higher value in the range indicates a higher correlation between the captured voiceprint and the registered voiceprint and a lower value in the range indicates a lower correlation between the captured voiceprint and the registered voiceprint. After generating a correlation value, system 100 proceeds to 312.

At 312, system 100 is configured to evaluate a result of the comparison. This evaluation is performed in order to determine if there is a great likelihood that the captured voiceprint and the registered voiceprint are from the same authorized user of the account that was provided at 312. As discussed above, system 100 may use the correlation value, which was generated at 310, to determine if the captured voiceprint matches, substantially matches, or has a great likelihood of being the registered voiceprint. In making this determination, system 100 may also utilize a threshold value in the evaluation process.

System 100 may have a threshold value that is applicable to a set of enrolled users. Additionally or alternatively, system 100 may have a threshold value that is applicable to a particular enrolled user. The threshold value may be set by system 100 upon receiving a request, including the new threshold value and at least one individual whose voiceprint will be affected and evaluated by this new threshold value.

To illustrate, system 100 may have a lower threshold value for bank employees in a customer service department than that of a bank customer because the bank employees may work in an environment, which may receive significant background noise in any given instant. In this non-limiting example, the threshold value for the bank employees may be set to 70, whereas the threshold value of the bank customer may be set to 90. As another example, system 100 may designate a higher threshold value to an authorized user of an account in which unusual account activity has been detected or that has a history of fraudulent activity.

In general, the threshold value serves as a metric by which captured voiceprints may be validated or rejected by system 100. In this regard, for example, if the correlation value exceeds the threshold value, then the process proceeds to 314. In the alternative, if the correlation value does not exceed the threshold value, then the process proceeds to 322.

At 314, system 100 validates the captured voiceprint when the correlation value is greater than the threshold value. In such an instance, system 100 is configured to indicate that the captured voiceprint is valid.

At 316, system 100 is configured to store the captured voiceprint in the voiceprint database/server system 110B. More specifically, the captured voiceprint may be stored in the database section of authorized voiceprints within the voiceprint database/server system 110B.

At 318, system 100 is configured to utilize the captured voiceprint as additional data that may be used to enhance, fine-tune, and/or temper the registered voiceprint and corresponding data. System 100 may implement a mathematical algorithm to improve and/or temper matching voiceprints. This may include the averaging and/or weighting of data points of valid, authenticated, and/or registered voiceprints, which can be associated with the same authorized user.

At 320, system 100 is configured to indicate that the voiceprint quality is not acceptable. The voiceprint quality may be deemed unacceptable in a number of instances. To illustrate, the voiceprint quality may be deemed unacceptable, for example, when the communication device 140 or any other link over the network has a weak connection. The voiceprint quality may be deemed unacceptable as a result of system 100 receiving faint voice data. The voiceprint quality may be unacceptable, for example, if there is a lot of background noise. In any event, whatever, the reason, once system 100 determines that the voiceprint is unacceptable, system 100 may terminate the process or request the user to perform this procedure at a later time.

At 322, system 100 does not validate the captured voiceprint. In such an instance, system 100 is configured to indicate that the captured voiceprint is not valid. This indication may cause system 100 to perform a number of actions in response thereto. For example, system 100 may cause system to proceed to 324.

At 324, system 100 is configured to store the captured voiceprint in the voiceprint database/server system. Since the captured voiceprint is not valid, system 100 is configured to store the captured voiceprint in the database section of imposter voiceprints.

As discussed above, system 100 is able to determine if a newly received voice-out produces a voiceprint that substantially matches or has a relatively high correlation to the registered voiceprint, which is stored in the database system. System 100 is thus configured to use voice recognition to determine if the individual, attempting to access the account and/or conduct a transaction, is in fact the authorized user of the account, identified at 302. This feature provides another layer of security for authorized users and another obstacle for unauthorized users.

Figure 4:
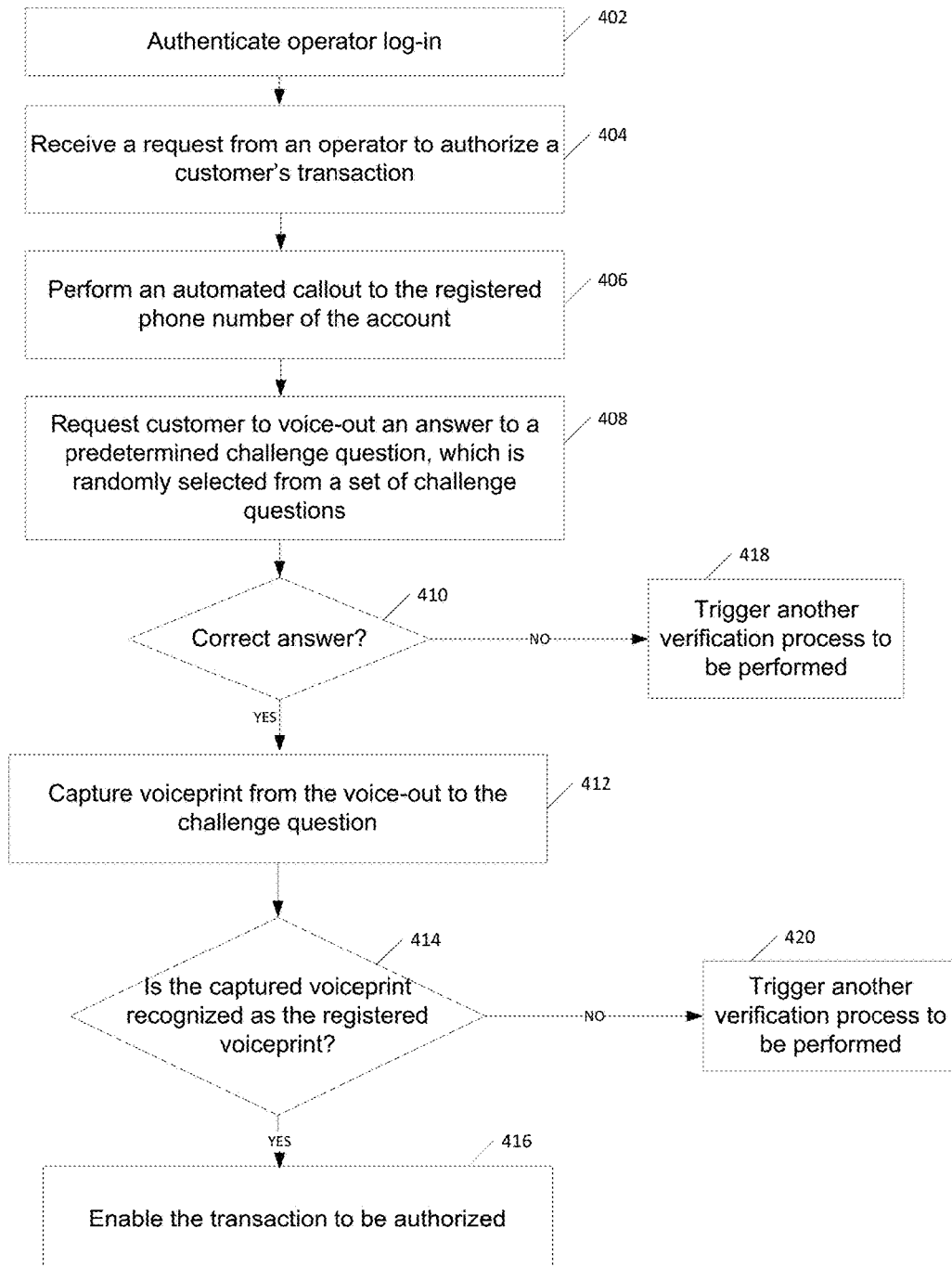
FIG. 4 shows a method of providing a secure transaction by using the voiceprint authentication process of FIG. 3 is shown according to an exemplary embodiment.

Referring to FIG. 4, a method of conducting a secure transaction using the voiceprint authentication process of FIG. 3 is shown. More specifically, FIG. 4 illustrates an example of a method that uses the voice recognition process to verify that an authorized user actually conducted the transaction. For example, the transaction may be a high-value electronics funds transfer.

At 402, system 100 is configured to authenticate a login of a user when the requested information, which has been input into the system, matches the registered information, which is stored in the system. When such a match occurs, the user is logged into system 100, thereby gaining access to a number of user interfaces associated with the user's account and privileges. In this case, the user may be an operator or an employee of the banking institution that needs to verify that the customer (i.e., authorized user of the account) conducted the transaction.

At 404, system 100 is configured to receive a request from an operator to authorize a customer's transaction. This request may be sent to system 100 when the operator selects a transaction to be authorized and initiates the process to authorize the selected transaction.

At 406, system 100 is configured to perform an automated callout to the customer's registered phone number. System 100 may implement a rule-based system to trigger an outbound call to the customer. The automated callout may be made to the most recent phone number that is registered in the customer's profile system. By employing an automated system that is rule-based, system 100 is able to protect the customer from internal fraud.

At 408, system 100 is configured to request the customer to voice-out an answer to a challenge question, which is randomly selected from a set of predetermined challenge questions. To provide this functionality, system 100 requires the authorized user to provide answers to the set of challenge questions prior to undergoing the process set forth in FIG. 4. System 100 may enable these challenge questions to be user configurable. These challenge questions may also be set by the bank.

At 410, system 100 is configured to determine if the answer is correct. In order to make this determination, the system determines if the answer matches the information, which has been previously collected from the authorized user. By requesting an answer to a random challenge question and determining if the answer is correct in real-time, system 100 is able to prevent the authorization of fraudulent attempts based upon, for example, the use of a pre-recorded voice data and/or an impersonation.

If the answer is correct, the system proceeds to 412. If the answer is not correct, then the system proceeds to 420.

At 412, system 100 is configured to capture a voiceprint from the voice-out to the challenge question. The method of capturing a voiceprint is similar to that as discussed with respect to 212 of FIG. 2. In addition, in one embodiment, to enhance the clarity of the captured voiceprint, system 100 may perform a noise-reduction process to improve the quality of the voiceprint to the extent possible.

At 414, system 100 is configured to determine if the captured voiceprint is recognized as the registered voiceprint. Based on a result of the voiceprint verification process, as shown in FIG. 3, system 100 is configured to store the voiceprint in a database section for authorized voiceprints to further temper the registered voiceprint of the user, as shown at 316, or store the voiceprint in the imposter database, as shown at 324.

At 416, after both the answer to the challenge question and the voiceprint have been authenticated, system 100 is configured to enable the transaction to proceed through the process of being authorized. In one example, system 100 may provide the operator with an indication that the voiceprint has been authenticated and may further enable the operator to finalize and/or execute the transaction.

At 418, when the correct answer to the challenge question is not provided, system 100 is configured to trigger another verification process to be performed. This feature prevents the system from falsely rejecting a customer on this basis of step 410 alone. In one example, system 100 may notify the operator that another verification process should be performed, and may allow the operator to perform this verification process, thereby providing the customer with the satisfaction of communicating with a live operator. In certain instances, system 100 may assist the operator in placing a call to at least one authorized user of the account by accessing the registered phone number and dialing this number for the operator.

At 420, when the captured voiceprint is not recognized to be the registered/authorized voiceprint, system 100 is configured to trigger another verification process to be performed. This feature prevents system from falsely rejecting a customer on the basis of the voice-out alone. For example, system 100 may falsely reject a voice-out of an authorized user if the voice-out is received with a lot of background noise. As another example, system 100 may falsely reject a voice-out of an authorized user having an uncharacteristically hoarse voice, as a result of a cold. Accordingly, to prevent such an occurrence, for example, system 100 may notify the operator that another verification process should be performed, and may allow the operator to perform this verification process, thereby providing the customer with the satisfaction of communicating with a live operator. In certain instances, system 100 may assist the operator in placing a call to at least one authorized user of the account by accessing the registered phone number and dialing this number for the operator.

As described above, system 100 is configured to provide voice recognition features to verify that the individuals, initiating or conducting transactions, are authorized to do so. In addition, to provide even greater security and protection, system 100 may combine the voice recognition functionality with other verification processes.

As an example, system 100 may perform not only voice authentication, as described above, but also require other verification procedures. For example, system 100 may also employ different levels of security for different types of transactions. In one embodiment, system 100 may include two levels of authentication. The first level ("Level A") may relate to information concerning the user. For example, "level A" information, which would require verification, may include a user's full name, a user's address, and/or any other information concerning the user. The second level ("Level B") may relate to information concerning the account. For example, "level B" information, which would require verification, may include the last transaction of the account, card verification value (CVV), and/or knowledge of the account history. Transactions, which are of the level B type, may further request the user to provide static information (e.g., account number) together with dynamic information (e.g., current balance of the account).

As an example, system 100 may require voiceprint authentication, as well as a one time password (OTP) from the individual, to be able to process the level B type transaction. To illustrate, system 100 may include features that may require voiceprint authentication and password verification to be able to authenticate customers and confirm investment orders/sales, treasury deals, investment closure wrappers, and other transactions. Security measures, which include both voiceprint authentication and password verification, can also assist system 100 in services related to receiving customer instructions for banking transactions, fund transfers, and other transactions. This combination of features may also be used to allow customers to change/update customer profile information, customer demographic information, and other information. Furthermore, by implementing voiceprint authentication and password verification, these features can replace existing paper/fax instructions, which are often requested in certain protocols. In one embodiment, the system 100 can use the voiceprint authentication in the place of level A information, and the system 100 would proceed to obtain level B authentication once the voiceprint is authenticated.

Figure 5:
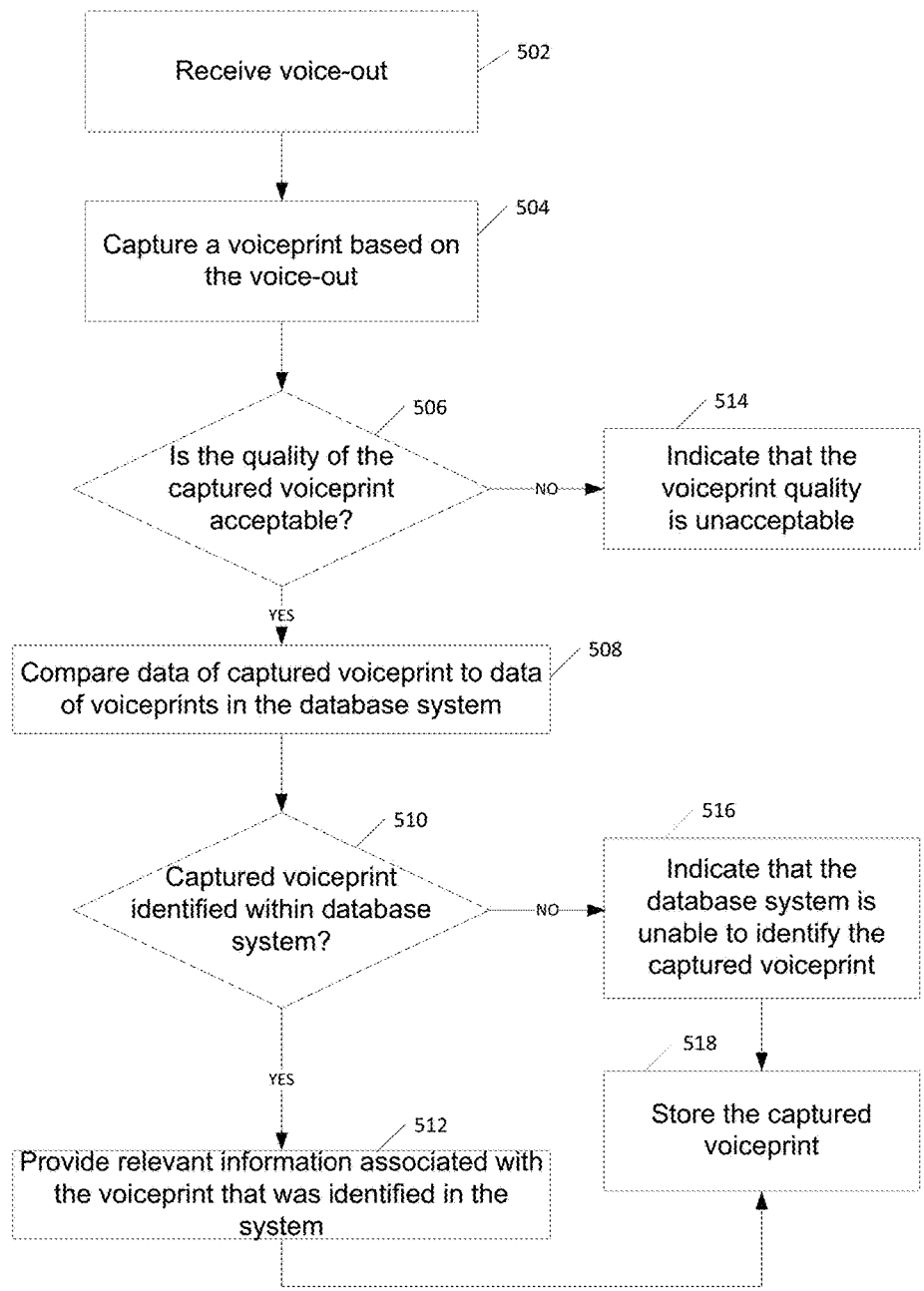
FIG. 5 shows a method of determining if a newly received voiceprint has been previously received by the system is shown.

Referring to FIG. 5, a method of determining if a newly received voiceprint has been previously received by the system is shown. FIG. 5 illustrates an exemplary method related to voice identification.

At 502, system 100 is configured to receive a voice-out. The voice-out may be received via communication device 140. In such a case, the voice-out or the voice data is transmitted from the communication device 140 to system 100.

At 504, system 100 is configured to capture a voiceprint based on the voice-out. The method of capturing a voiceprint is similar to that as discussed with respect to 212 of FIG. 2. In addition, in one embodiment, to enhance the clarity of the captured voiceprint, system 100 may perform a noise-reduction process to improve the quality of the voiceprint to the extent possible.

At 506, system 100 is configured to determine if the quality of the voiceprint is acceptable. If the quality of the voiceprint is deemed to be acceptable in accordance with predetermined standards, then the process proceeds to 508. If the quality of the voiceprint is not acceptable, then the process proceeds to 516.

At 508, system 100 is configured to analyze the voiceprint and compare the data of the captured voice to data of voiceprints that are stored in the voiceprint database/server system 110B. The captured voiceprint may be compared to voiceprints stored in the database section of authorized voiceprints, as well as the voiceprints stored in the database section of imposter voiceprints. In other words, system 100 can make a determination as to whether the voiceprint has been enrolled or previously stored in voiceprint database/server system 110B. System may implement a search strategy or technique to achieve this objective.

At 510, system 100 is configured to determine if the captured voiceprint is identified within the database system. If the captured voiceprint is identified within the database system, then the process proceeds to 512. If the captured voiceprint is not identified as being within the voiceprint database/server system 110B, then the process proceeds to 516.

At 512, system 100 is configured to provide any relevant information that is associated with the identified voiceprint. In the event that the captured voiceprint identifies an authorized user, then the relevant information, provided by system 100, may include the corresponding user profile information (e.g., customer profile information, staff profile information), as well as any account information. In the event that the captured voiceprint is identified as being within the database section of imposter voiceprints, then the relevant information, provided by system 100, may include an audit of every instance that that voiceprint was received by system 100 along with any information relating to those instances. In such an instance, system 100 may also be configured to notify the appropriate entity, which may act on this information.

At 514, system 100 is configured to indicate that the voiceprint quality is unacceptable. The voiceprint quality may be deemed unacceptable in a number of instances, as discussed in 320 of FIG. 3. In any event, whatever, the reason, once system 100 determines that the voiceprint is unacceptable, system 100 may terminate the process or request the user to perform this procedure at a later time.

At 516, system 100 is configured to indicate that the voiceprint database/server system is unable to identify the captured voiceprint. This may be an indication that the voice data, as received at 510, is being received by system 100 for the first time.

At 518, system 100 is configured to store the captured voiceprint in the voiceprint database/server system for future reference along with any information that was received by the system in association with the voice data. In addition to storing the voiceprint, in the event that the captured voiceprint matches a voiceprint stored in system 100, then system 100 will also temper the stored voiceprint, which was identified as being a match, with the captured voiceprint. Alternatively, in the event that the captured voiceprint does not match a voiceprint stored in system 100, then system 100 may store the captured voiceprint in the database section of imposter voiceprints and/or classify the captured voiceprint as an invalid voiceprint or as an imposter voiceprint.

As described above, the voice identification feature of system 100 determines whether or not the received voiceprint belongs to a user that is enrolled in the voiceprint database/server system 110B. This feature, as provided by system 100, may be implemented in a variety of instances.

In one example, system 100 may be configured to implement the voice identification feature after determining at step 324 of FIG. 3 that the captured voiceprint is not valid and should be classified as an imposter voiceprint and/or stored in the database section of imposter voiceprints. That is, system 100 may receive a request to find out other information that may be associated with a matching voiceprint, if available, in system 100. System 100 may also receive a request to determine if the captured voiceprint is identifiable in system 100. This may be helpful in instances in which, for example, there was a slight error in the identifying data that was provided at step 302 of FIG. 3.

As another example, system 100 may be controlled such that this voice identification feature is able to assist in identifying callers and provide corresponding information of the identified caller. To illustrate, a customer may call a relationship manager directly. System 100 may capture the voiceprint of the customer, placing the call. System 100 may then implement the voice identification process to determine the identity of the customer based on the captured voiceprint. System 100 may then act in accordance with the results of the voice identification process. For example, system 100 may be configured to greet the customer based on the results of the voice identification process. As another example, system 100 may direct the caller and/or transfer the call to the appropriate entity (e.g., banking employee, security employee, automated information service announcement).

Also, system 100 may be configured to implement the voice identification feature to conduct a transaction. In this regard, for example, the customer may use a communication device 140, which may be provided by the bank, to submit voice data. The bank employee can then receive the customer's account information from system 100, provided that the customer is enrolled and registered in system 100, and conduct the transaction.

As an illustrative example, a customer may walk into a bank branch to perform a transaction. With system 100, the customer may opt to have his/her voice data captured via a communication device 140 (e.g. ATM having a communication device, a computer system of a bank teller, a workstation of a bank employee) in lieu of explicitly providing the necessary information, such as a bank issued card (e.g., ATM card, credit card, debit card), a personal identification card (e.g., driver's license, passport), personal identifying information (e.g. social security number), and/or account information (e.g., a check, a deposit slip). At this point, having implemented the voice identification process, system 100 may then notify the appropriate entity of the customer's identity in addition to any other pertinent information. As an example, upon discovering the customer's identity, system 100 may receive information regarding the customer's accounts and notify the relationship manager, who is handling the customer's account or handling the same type of accounts as the customer's accounts, of the customer's presence. Also, should the appropriate bank employee be unavailable, system 100 may also be configured to provide additional services to provide assistance to the customer. These additional services, which may be provided by system 100, may include, for example, notifying the customer when the appropriate bank employee is available. The notification may be sent as an automated callout/text to the registered phone number of the customer, a status update on a user interface of the user's online account, and/or an e-mail message.

Also, in certain instances, such as the above example, system 100 may require that both the customer and the bank employee undergo the voiceprint authentication process in order to conduct or complete the transaction. The implementation of this procedure ensures that the customer is an authorized user of the account and that the bank employee has the authority to be involved in the transaction. By requiring these voiceprints, system 100 ensures that a fraudulent attempt does not occur at either end (e.g., customer, bank employee) of the transaction. Such an arrangement provides an added level of security.

As described above, the embodiments described herein are configured to provide secure transactions by authenticating authorized users via biometric data. In addition, the embodiments described herein are configured to provide pertinent information relating to biometric data that has been acquired by the system.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments can relate to an apparatus for performing one or more of the functions described herein. This apparatus may be specially constructed for the required purposes, or it may comprise a general-purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known non-transitory devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for or included in the particular examples described herein and such additions or substitutions still fall within the scope of the invention.

What is claimed is:

1. A computer-implemented method for conducting a secure electronic transaction, the method comprising:
   receiving, by a computer, a request to authorize the secure electronic transaction for an account corresponding to an enrolled user;
   automatically calling, by the computer, to a registered phone number of the enrolled user;
   during the automated call to the enrolled user, requesting, by the computer, that the enrolled user voice-out an answer more than one time to each of one or more predetermined challenge questions randomly selected from a list of questions;
   generating, by the computer in real-time, a voiceprint from each voice-out of the enrolled user answering the challenge question more than one time, wherein the computer uses the voice-out of each answer to update the voiceprint registered in a database;
   capturing, by the computer, a voice-out from a second person;
   determining, by the computer, a likelihood that the captured voice-out and a registered voiceprint of the enrolled user stored in a computer readable medium both originate from the enrolled user based upon a comparison,
   upon determining that the captured voice-out and the registered voiceprint likely originate from the enrolled user:
      tempering, by the computer, the registered voiceprint of the enrolled user using the captured voice-out, wherein tempering the voiceprint further comprises averaging and weighting a plurality of data points of the registered voiceprint and the captured voice-out, and updating, by the computer, the registered voiceprint of the enrolled user stored in the computer readable medium, and
      authorizing, by the computer, the secure electronic transaction; and
   upon determining that the captured voice-out does not likely originate from the enrolled user:
      comparing, by the computer, the captured voice-out with voiceprints in an imposter database configured to store voice-outs not matching voiceprints of enrolled users and related information corresponding to the voice-out not matching the voiceprints of enrolled users;
      upon determining, by the computer, the captured voice-out is identified as being within the imposter database:
         generating, by the computer, a report of the related information of the captured voice-out based on data in the imposter database;
         notifying, by the computer, a computing device associated with an entity with the report.

2. The method according to claim 1, wherein said response to the request to authorize the secure transaction includes:
   authorizing, by the computer, the secure electronic transaction when the captured voice-out and the registered voiceprint are determined by the comparison to have a correlation value that results in a likelihood that exceeds a threshold value;
   rejecting, by the computer, the secure electronic transaction when the captured voice-out and the registered voiceprint are determined by the comparison to have a correlation value that results in a likelihood that does not exceed the threshold value.

3. The method according to claim 2, further comprising:
   storing, by the computer, the captured voice-out in the computer readable media;
   classifying, by the computer, the captured voice-out in the computer readable media as being invalid upon rejecting the secure electronic transaction.

4. The method according to claim 2, further comprising:
   receiving, by the computer, a request to identify the captured voice-out when the request to authorize the secure transaction is rejected;
   searching, by the computer, the computer readable media for a stored voiceprint that substantially matches the captured voice-out; and
   returning, by the computer, information pertaining to the search.

5. The method according to claim 2, further comprising:
receiving, by the computer, a request to set the threshold value to a selected value; and
setting, by the computer, the threshold value to the selected value in accordance with the request.

6. The method of claim 1, wherein upon determining that the answer does not match a previously provided answer by the enrolled user, triggering, by the computer, a new verification process in which the an operator communicates with the user and a voice print from the communication is captured.

7. The method according to claim 1, wherein the registered voiceprint is stored in the computer readable media upon completing a voiceprint registration process that includes:
receiving, by the computer, a request to register voice data;
accessing, by the computer, the phone number that is stored in the computer readable media and associated with the enrolled user;
initiating, by the computer, a voice registration call to the phone number;
capturing, by the computer, a voiceprint in association with voice data received from the voice registration call;
storing, by the computer, the voiceprint, associated with voice data received from the voice registration call, as the registered voiceprint in the computer readable media.

8. The method according to claim 6, wherein the request to register voice data is received after the computer system successfully receives account information and a password from the enrolled user via a login process for an online account of a secure online channel.

9. A non-transitory computer readable medium having computer readable program code therein, the computer readable program code being executable by a processor to implement a method for conducting a transaction, the method comprising:
receiving a request to authorize the secure electronic transaction for an account corresponding to an enrolled user;
automatically calling to a registered phone number of the enrolled user;
during the automated call to the enrolled user, requesting, by the computer, that the enrolled user voice-out an answer more than one time to each of one or more predetermined challenge questions randomly selected from a list of questions;
generating in real-time, a voiceprint from each voice-out of the enrolled user answering the challenge question more than one time, wherein the computer uses the voice-out of each answer to update the voiceprint registered in a database;
capturing a voice-out from a second person;
determining a likelihood that the captured voice-out and a registered voiceprint of the enrolled user that is stored in a computer readable medium both originate from the enrolled user based upon a comparison,
upon determining that the captured voice-out and the registered voiceprint likely originate from the enrolled user:
tempering the registered voiceprint of the enrolled user using the captured voice-out, wherein tempering the voiceprint further comprises averaging and weighting a plurality of data points of the registered voiceprint and the captured voice-out, and
updating the registered voiceprint of the enrolled user stored in the computer readable medium, and
authorizing the secure electronic transaction;
upon determining that the captured voice-out voiceprint does not likely originate from the enrolled user:
comparing the captured voice-out with voiceprints in an imposter database configured to store voice-outs not matching voiceprints of enrolled users and related information corresponding to the voiceprints not matching the voiceprints of enrolled users;
upon determining the captured voice-out is identified as being within the imposter database;
generating a report of the related information of the captured voice-out based on data in the imposter database;
notifying a computing device associated an entity with the report.

10. The non-transitory computer readable medium according to claim 9, wherein said response to the request to authorize the secure transaction includes:
authorizing the secure electronic transaction when the captured voice-out and the registered voiceprint are determined by said comparison to have a correlation value that results in a likelihood that exceeds a threshold value;
rejecting the secure electronic transaction when the captured voice-out and the registered voiceprint are determined by said comparison to have a correlation value that results in a likelihood that does not exceed the threshold value.

11. The non-transitory computer readable medium according to claim 10, further comprising:
storing the captured voiceprint in the computer memory;
classifying the captured voice-out in the computer readable media as being invalid upon rejecting the secure electronic transaction.

12. The non-transitory computer readable medium according to claim 9, further comprising:
receiving a request to identify the captured voiceprint when the request to authorize the secure transaction is rejected;
searching the computer readable media for a stored voiceprint that substantially matches the captured voice-out; and
returning results and relevant information pertaining to the search.

13. The non-transitory computer readable medium according to claim 9, further comprising:
receiving a request to set the threshold value to a selected value; and
setting the threshold value to the selected value in accordance with the request.

14. The non-transitory computer readable medium according to claim 9, upon determining that the answer does not matches a previously provided answer by the enrolled user, triggering a new verification process in which the an operator communicates with the user and a voice print from the communication is captured.

15. The non-transitory computer readable medium according to claim 9, wherein the registered voiceprint is stored in the computer memory upon completing a voiceprint registration process that includes:
receiving a request to register voice data;
accessing the phone number that is stored in the computer readable media and associated with the enrolled user;
initiating a voice registration call to the phone number;

capturing a voiceprint in association with voice data received from the voice registration call;

storing the voiceprint, associated with voice data received from the voice registration call, as the registered voiceprint in the computer memory.

16. The non-transitory computer readable medium according to claim 15, wherein the request to register voice data is received after the computer system successfully receives account information and a password from the enrolled user via a login process for an online account of a secure online channel.

17. The method according to claim 1, wherein the second user is a representative of a bank holding the account of the enrolled user.

18. The non-transitory computer readable medium according to claim 9, wherein the second user is a representative of a bank holding the account of the enrolled user.

* * * * *